US010374433B2

(12) United States Patent
Ito

(10) Patent No.: US 10,374,433 B2
(45) Date of Patent: Aug. 6, 2019

(54) POWER SUPPLY SYSTEM

(71) Applicant: DENSO CORPORATION, Kariya, Aichi-pref. (JP)

(72) Inventor: Akira Ito, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 256 days.

(21) Appl. No.: 15/526,377

(22) PCT Filed: Dec. 1, 2015

(86) PCT No.: PCT/JP2015/005966
§ 371 (c)(1),
(2) Date: May 12, 2017

(87) PCT Pub. No.: WO2016/092774
PCT Pub. Date: Jun. 16, 2016

(65) Prior Publication Data

US 2017/0317502 A1 Nov. 2, 2017

(30) Foreign Application Priority Data

Dec. 9, 2014 (JP) ................................ 2014-249150

(51) Int. Cl.
*H02J 1/10* (2006.01)
*H02J 3/38* (2006.01)
(Continued)

(52) U.S. Cl.
CPC ........... *H02J 3/383* (2013.01); *H01M 10/441* (2013.01); *H02J 3/32* (2013.01); *H02J 7/0068* (2013.01);
(Continued)

(58) Field of Classification Search
CPC .. H01M 10/441; H01M 2220/10; H02J 15/00; H02J 3/32; H02J 3/383;
(Continued)

(56) References Cited

U.S. PATENT DOCUMENTS

2013/0024035 A1 1/2013 Ito et al.
2014/0042978 A1* 2/2014 Nishibayashi .......... H02J 7/007 320/134
2014/0070756 A1* 3/2014 Kearns .................... H02J 7/007 320/101

FOREIGN PATENT DOCUMENTS

JP 2013027214 A 2/2013
JP 2013049600 A 3/2013
JP 2014122399 A 7/2014

* cited by examiner

*Primary Examiner* — Rexford N Barnie
*Assistant Examiner* — Toan T Vu
(74) *Attorney, Agent, or Firm* — Harness, Dickey & Pierce, P.L.C.

(57) ABSTRACT

A power supply system is provided. The power supply system includes a first controller for controlling charge and discharge of a first electric storage apparatus and a second controller for controlling charge and discharge of a second electric storage apparatus. The first controller generates first scheduling data indicating transition of electric power to be charged and discharged from the first electric storage apparatus during a first prediction period. The second controller generates second scheduling data indicating transition of electric power to be charged and discharged from the second electric storage apparatus during a second prediction period containing the first prediction period. Generation of the first scheduling data is performed based on the second scheduling data previously generated by the second controller.

5 Claims, 5 Drawing Sheets

(51) Int. Cl.

| | |
|---|---|
| ***H02J 9/00*** | (2006.01) |
| ***H02J 7/00*** | (2006.01) |
| ***H02J 7/35*** | (2006.01) |
| ***H01M 10/44*** | (2006.01) |
| ***H02J 3/32*** | (2006.01) |
| ***H02J 15/00*** | (2006.01) |

(52) U.S. Cl.
CPC ................ *H02J 7/35* (2013.01); *H02J 15/00* (2013.01); *H01M 2220/10* (2013.01); *Y02B 10/14* (2013.01); *Y02E 10/563* (2013.01); *Y02E 10/566* (2013.01); *Y02E 70/30* (2013.01)

(58) Field of Classification Search
CPC ........... H02J 7/0068; H02J 7/35; Y02B 10/14; Y02E 10/563; Y02E 10/566; Y02E 70/30
USPC ............................................................ 307/23
See application file for complete search history.

POWER SUPPLY SYSTEM

CROSS REFERENCE TO RELATED APPLICATIONS

This application is a U.S. National Phase Application under 35 U.S.C. 371 of International Application No. PCT/JP2015/005966 filed on Dec. 1, 2015 and published in Japanese as WO 2016/092774 A1 on Jun. 16, 2016. This application is based on and claims the benefit of priority from Japanese Patent Application No. 2014-249150 filed on Dec. 9, 2014. The entire disclosures of all of the above applications are incorporated herein by reference.

TECHNICAL FIELD

The present disclosure relates to a power supply system to supply power to buildings.

BACKGROUND ART

Recently, there is increasing interest in the power generation using natural energy such as solar power generation or wind-power generation from the viewpoint of resource protection and prevention of global warming. In consideration of this, there is developed a power supply system capable of supplying buildings with the power generated by the sunlight in addition to or in place of the power from an electrical grid (see Patent Literature 1 below).

However, the electric power generated by using the natural energy (hereinafter also referred to as "generated electric power") largely varies with a change in the amount of solar radiation or a wind velocity. The electric power demand in a building largely varies with daily time period. Typically, peak daily time periods of these differ from each other.

The power supply system generally includes an electric storage apparatus in order to temporarily store the generated electric power in excess of the demand in the building and to supplement the generated electric power insufficient for the demand by discharging. For example, the electric storage apparatus is available as a stationary storage battery and may be available as a storage battery that is included in an electric vehicle and is cable-connected to the building. Efficiently charging and discharging the electric storage apparatus for every daily time period in consideration of demand-and-supply balance of the electric power (balance between an electric power demand in the building and the generated electric power) can suppress the electric power supplied from the electrical grid to the building and reduce the electric power rate to be paid to an electric power company.

Patent Literature 1 discloses a power supply system that can optimize a charge-discharge schedule for the electric storage apparatus based on a transition of the power generation quantity and the future electric power demand predicted.

The electric storage apparatus can store a limited amount of electric power. Suppose the generated electric power remains large for a long time. In such a case, reverse power flow is needed to supply not-stored surplus electricity back to the electrical grid. The reverse power flow is favorable from the viewpoint of reducing an electric power rate by electric power selling. Patent Literature 1 also discloses a method of optimizing a charge-discharge schedule on condition that the electric power selling minimizes the electric power rate.

However, an excessively increasing number of buildings performing the reverse power flow causes an undesirable decrease in the quality of electric power (causing frequencies to be unstable) in the electrical grid. It is therefore considered impractical to widely use a power supply system that presupposes the reverse power flow. In consideration of this, it is more favorable to minimize an occurrence of reverse power flow and use the generated electric power for a large percentage of electric power demand in a building, namely, promote local production for local consumption in terms of electric power.

PRIOR ART LITERATURES

Patent Literature

Patent Literature 1: JP 2013-27214 A

SUMMARY OF INVENTION

The power supply system described in Patent Literature 1 above can optimize the charge-discharge schedule under the condition of minimizing the reverse power flow. However, the charge-discharge schedule to be optimized is calculated only in consideration of the demand-and-supply balance of the electric power during a relatively short period (e.g., 24 hours). The charge-discharge schedule does not consider the demand-and-supply balance of the electric power during a longer period (e.g., one week).

The system is therefore capable of fine-tuned control in consideration of variations in the electric power demand or the generated electric power in 24 hours. However, the system does not consider variations in the generated electric power during several days. For example, the system can hardly take measures to previously decrease a stored electricity amount in anticipation of the possibility that fine weather would continue three days later and the generated electric power would increase (to increase the surplus electricity). The reverse power flow may be therefore needed depending on long-term variations in a power generation condition (weather).

It is an object of the present disclosure to provide a power supply system capable of local electric power production for local consumption by performing charge and discharge in consideration of not only variations in demand-and-supply balance during a short period of time, but also variations in demand-and-supply balance during a long period of time.

A power supply system in an aspect of the present disclosure comprises: a power-generating apparatus that supplies a building with electric power generated by using natural energy; a first electric storage apparatus that stores electric power generated by the power-generating apparatus and electric power supplied from an electrical grid and is capable of supplying stored electric power to the building; a second electric storage apparatus that has a larger capacity than the first electric storage apparatus, stores electric power generated by the power-generating apparatus and electric power supplied from the electrical grid, and is capable of supplying stored electric power to the building; a first controller that controls charge and discharge of the first electric storage apparatus; and a second controller that controls charge and discharge of the second electric storage apparatus.

The first controller includes: a first scheduling portion that generates first scheduling data indicating transition of electric power to be charged and discharged from the first electric storage apparatus during a first prediction period, based on first demand prediction data indicating transition of electric power predicted to be consumed in the building during the first prediction period, first power generation prediction data indicating transition of electric power predicted to be generated in the power-generating apparatus during the first prediction period, and an actual measurement value of stored electricity amount of the first electric storage apparatus; and a first control portion that controls charge and discharge of the first electric storage apparatus to comply with the generated first scheduling data.

The second controller includes: a second scheduling portion that generates second scheduling data indicating transition of electric power to be charged and discharged from the second electric storage apparatus during a second prediction period containing the first prediction period, based on second demand prediction data indicating transition of electric power predicted to be consumed in the building during the second prediction period, second power generation prediction data indicating transition of electric power predicted to be generated in the power-generating apparatus during the second prediction period, and an actual measurement value of stored electricity amount of the second electric storage apparatus; and a second control portion that controls charge and discharge of the second electric storage apparatus to comply with the generated second scheduling data.

The first scheduling portion generates the first scheduling data based on the second scheduling data previously generated by the second scheduling portion.

The power supply system with the above-mentioned configuration provides fine-tuned control in consideration of variations in a short-term demand-and-supply balance based on charge and discharge from the first electric storage apparatus having the relatively small capacity. The power supply system also provides control (rough adjustment for excess and deficiency) in consideration of variations in a long-term demand-and-supply balance based on charge and discharge from the second electric storage apparatus having the relatively large capacity.

Moreover, the generation of the first scheduling data by the first scheduling portion is performed based on the second scheduling data previously generated by the second scheduling portion, and accordingly, the above-mentioned two controls are performed in cooperation with each other. Charge and discharge are therefore performed based on a charge-discharge schedule that considers not only variations in the demand-and-supply balance during a short period, but also variations in the demand-and-supply balance during a long period. It is therefore possible to suppress reverse power flow and achieve local electric power production for local consumption.

As above, it is possible to provide the power supply system capable of local electric power production for local consumption by performing charge and discharge in consideration of not only variations in demand-and-supply balance during a short period of time, but also variations in demand-and-supply balance during a long period of time.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
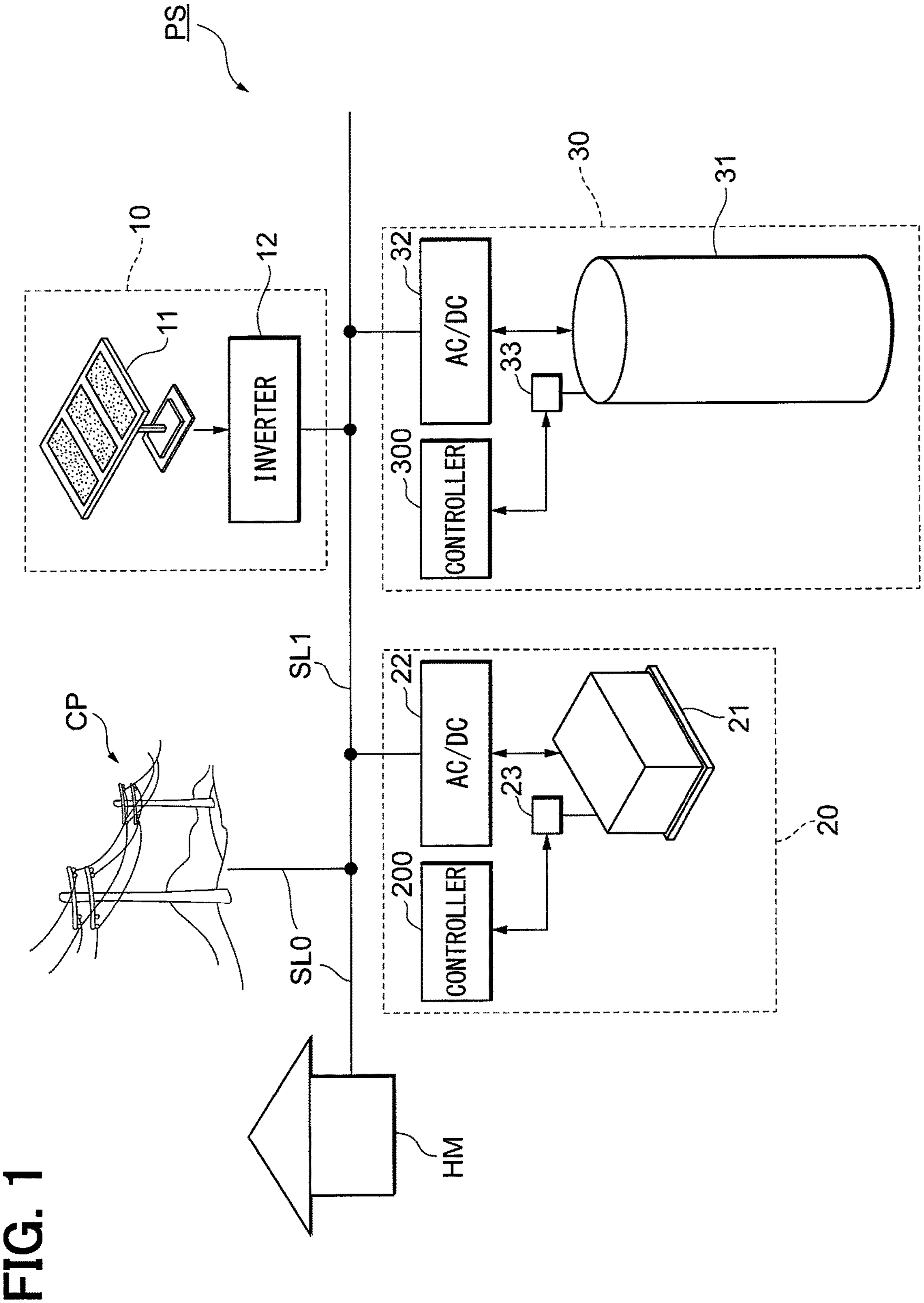
FIG. 1 is a diagram schematically illustrating an overall configuration of a power supply system according to an embodiment.

Embodiments will be described with reference to the accompanying drawings. The same components in the drawings are depicted by the same reference numerals wherever possible and a redundant description is omitted for simplicity.

The description below explains power supply system PS according to an embodiment with reference to FIG. 1. Power supply system PS is configured as a system that supplies electric power to house HM.

House HM is also supplied with the electric power from electrical grid CP as a commercial power supply. Electrical grid CP and house HM are connected via power supply line SL0 as an alternate current bus line. Electrical grid CP supplies house HM with alternating-current power of single phase 100 V via power supply line SL0. A power-using instrument (load) installed in house HM operates on the electric power mainly supplied from electrical grid CP.

Power supply system PS is connected to the power supply line SL0 which connects electrical grid CP with house HM. Power supply system PS supplies house HM with auxiliary electric power via power supply line SL0 and suppresses the electric power supplied to house HM from electrical grid CP. Power supply system PS includes a solar power generation unit 10, a storage battery unit 20, and a hydrogen storage unit 30.

The solar power generation unit 10 converts the sunlight energy into the electric power and supplies the electric power to house HM. The electric power from the solar power generation unit 10 is supplied to house HM via power supply line SL1 and power supply line SL0. Power supply line SL1 is an alternate current bus line whose one end is connected to power supply line SL0.

The solar power generation unit 10 includes a solar panel 11 and an inverter 12. The solar panel 11 generates the electric power by directly converting the sunlight energy into the electric power and is installed on a roof of house HM.

The inverter 12 is provided as an electric power converter that converts direct current electric power generated from the solar panel 11 into alternating-current power of single phase 100 V and supplies the electric power to power supply line SL1. As illustrated in FIG. 1, the embodiment connects one set of the solar panel 11 and the inverter 12 to power supply line SL1. The number of solar panels 11 and inverters 12 is not limited to one and may be increased or decreased depending on a scale of house HM or the performance of the solar panel 11.

The solar power generation unit 10 supplies the electric power to house HM during the daytime in the fine weather. This can suppress electric power supply from electrical grid CP to house HM and can reduce the electric power rate to be paid to an electric power provider.

The storage battery unit 20 and the hydrogen storage unit 30 are each provided as an electric storage apparatus to temporarily store the electric power that is supplied from the solar power generation unit 10 or electrical grid CP and is not consumed in house HM. The electric power supplied from electrical grid CP to house HM can be suppressed by supplying the electric power stored in the storage battery unit 20 and the hydrogen storage unit 30 to house HM during a daily time period in which house HM consumes a large amount of electric power.

Power supply system PS can perform reverse power flow to supply the electric power generated by the solar panel 11 to electrical grid CP when the storage battery unit 20 and the hydrogen storage unit 30 are fully charged. However, the embodiment provides control to suppress an occurrence of reverse power flow wherever possible by appropriately adjusting charge and discharge on the storage battery unit 20 and the hydrogen storage unit 30. The specific control will be described later.

The storage battery unit 20 includes a storage battery apparatus 21, an electric power converter 22, a stored electricity amount sensor 23, and a controller 200.

The storage battery apparatus 21 is provided as a secondary battery that uses a lithium-ion battery or a nickel hydride battery. The amount of electric power that can be accumulated in the storage battery apparatus 21 is smaller than the amount of electric power that can be accumulated in a hydrogen storage apparatus 31 to be described later.

The electric power converter 22 boosts direct current electric power from the storage battery apparatus 21, converts the electric power into alternating-current power, and supplies the power to power supply line SL1. The electric power converter 22 can be considered as adjusting the electric power between power supply line SL1 and the storage battery apparatus 21 and connecting both. The electric power converter 22 is also referred to as a power conditioner. The electric power converter 22 adjusts the magnitude of electric power output from the storage battery unit 20 to power supply line SL1 and the magnitude of electric power input (stored) from power supply line SL1 to the storage battery unit 20.

The stored electricity amount sensor 23 measures the amount of electric power currently stored (SOC) in the storage battery apparatus 21. The amount of electric power measured by the stored electricity amount sensor 23 is input to the controller 200.

The controller 200 is an apparatus to control operation of the electric power converter 22. The controller 200 is configured as a computer system including a CPU, ROM, RAM, and an input/output interface. A specific configuration of the controller 200 and control provided by the same will be described later.

The hydrogen storage unit 30 includes a hydrogen storage apparatus 31, an electric power converter 32, a stored amount sensor 33, and a controller 300.

The hydrogen storage apparatus 31 generates hydrogen based on electrolysis reaction using the input electric power and stores the hydrogen. The hydrogen storage apparatus 31 can generate electric power by using the stored hydrogen and output the generated electric power. The hydrogen storage apparatus 31 can be considered as an electric storage apparatus capable of converting the electric power into hydrogen, storing the hydrogen, converting the hydrogen into electric power, and outputting the electric power.

The description to follow may use term "accumulate" or "charge" to express storing hydrogen in the hydrogen storage apparatus 31 for illustrative purposes. Term "discharge" may be used to express power generation by using hydrogen stored in the hydrogen storage apparatus 31.

The amount of electric power that can be accumulated in the hydrogen storage apparatus 31 (comparable to the amount of electric power corresponding to the amount of hydrogen that can be stored) is larger than the amount of electric power that can be accumulated in the storage battery apparatus 21. An available change rate for the electric power input to or output from the hydrogen storage apparatus 31 is smaller than an available change rate in the storage battery apparatus 21.

The electric power converter 32 boosts direct current electric power from the storage battery apparatus 31, converts the electric power into alternating-current power, and supplies the power to power supply line SL1. The electric power converter 32 can be considered as adjusting the electric power between power supply line SL1 and the storage battery apparatus 31 and connecting both. The electric power converter 32 adjusts the magnitude of electric power output from the hydrogen storage apparatus 31 to power supply line SL1 and the magnitude of electric power input (stored) from power supply line SL1 to the hydrogen storage apparatus 31.

The stored amount sensor 33 measures the stored amount of hydrogen in the hydrogen storage apparatus 31. The stored amount measured by the stored amount sensor 33 is input to the controller 300.

The controller 300 is an apparatus to control operation of the hydrogen storage apparatus 31 and the electric power converter 32. The controller 300 is configured as a computer system including a CPU, ROM, RAM, and an input/output interface. A specific configuration of the controller 300 and control provided by the same will be described later.

Figure 2:
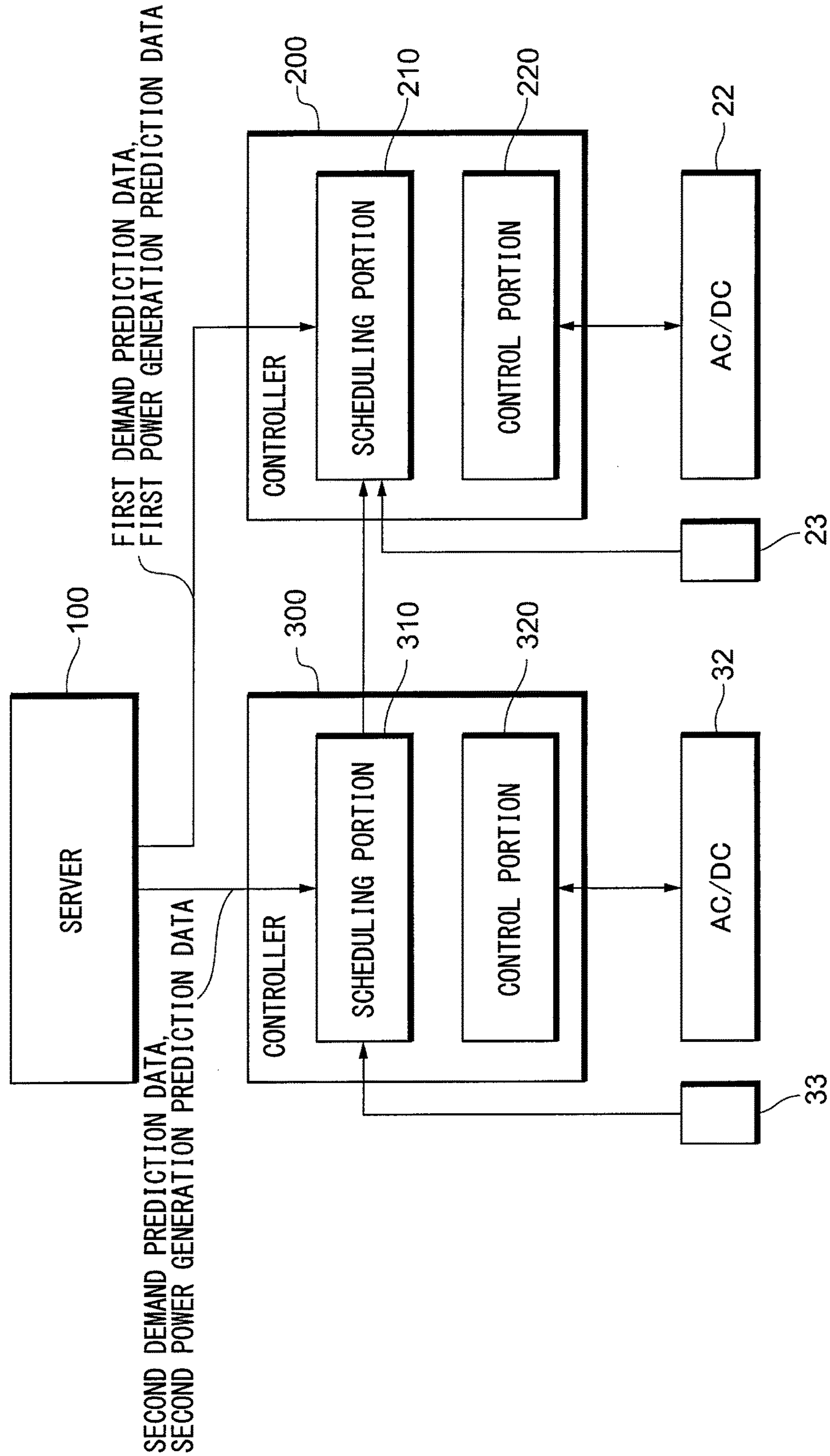
FIG. 2 is a diagram illustrating each configuration of a first controller and a second controller included in the power supply system illustrated in FIG. 1.

Configurations of the controller 200 and the controller 300 will be described with reference to FIG. 2. As illustrated in FIG. 2, the controller 200 includes a scheduling portion 210 and a control portion 220 as functional control blocks.

Data representing a schedule to charge and discharge the storage battery unit 20 (also referred to hereinafter as first scheduling data) during a time period of 24 hours from a predetermined time (also referred to hereinafter as a first prediction period) is generated by the scheduling portion 210. The first scheduling data is a numerical sequence in which target values corresponding to every 30 minutes for the electric power charged or discharged in the storage battery apparatus 21 are sequentially arranged. The first scheduling data therefore contains 48 numerical values.

The scheduling portion 210 generates the first scheduling data based on: data indicates variations of the electric power predicted to be consumed in house HM during the first prediction period (also referred to hereinafter as first demand prediction data); data indicates variations of the electric power predicted to be generated in the solar power generation unit 10 during the first prediction period (also referred to hereinafter as first power generation prediction data); and the stored electricity amount measured by the stored electricity amount sensor 23.

The first demand prediction data is a numerical sequence in which prediction values corresponding to every 30 minutes for the electric power predicted to be consumed in house HM during the first prediction period are sequentially arranged. The first demand prediction data therefore contains 48 numerical values. According to the embodiment, an externally installed server 100 beforehand calculates the first demand prediction data and transmits the first demand prediction data to the scheduling portion 210 by using communication prior to generation of the first scheduling data. The server 100 generates the first demand prediction data in consideration of past background of the electric power consumed in house HM or differences in electric power consumption depending on the day of the week.

In the embodiment, generation of the first demand prediction data may be performed by the external server 100 or may be performed by the controller 200. Various specific methods (algorithms) can be used to generate the first demand prediction data. There is no restriction on what generates the first demand prediction data in what manner.

The first power generation prediction data is a numerical sequence in which prediction values corresponding to every 30 minutes for the electric power predicted to be generated in the solar power generation unit 10 during the first prediction period for the electric power predicted to be generated in the solar power generation unit 10 during the first prediction period are sequentially arranged. The first power generation prediction data therefore contains 48 numerical values. In the embodiment, the externally installed server 100 beforehand calculates the first power generation prediction data and transmits the first power generation prediction data to the scheduling portion 210 by using communication prior to generation of the first scheduling data. The server 100 generates the first power generation prediction data in consideration of weather forecasting data or an incident angle of sunlight during the first prediction period.

In the embodiment, generation of the first power generation prediction data may be performed by the external server 100 or may be performed by the controller 200. Various specific methods (algorithms) can be used to generate the first power generation prediction data. There is no restriction on what generates the first power generation prediction data in what manner.

The control portion 220 controls operation of the electric power converter 22 so that the storage battery apparatus 21 charges or discharges the electric power in accordance with the first scheduling data. For example, the control portion 220 controls operation of the electric power converter 22 so that a value of electric power charged or discharged in the storage battery apparatus 21 equals the first numerical value (control target value) contained in the first scheduling data during the first 30 minutes of the first prediction period. Subsequently, every lapse of 30 minutes changes the control target value of the electric power charged or discharged in the storage battery apparatus 21.

As illustrated in FIG. 2, the controller 300 includes a scheduling portion 310 and a control portion 320 as functional control blocks.

The scheduling portion 310 generates second scheduling data during a second prediction period. The second prediction period corresponds to seven days elapsed from a predetermined time. The second scheduling data represents a schedule to charge and discharge the hydrogen storage unit 30. The second scheduling data is a numerical sequence in which target values corresponding to every 30 minutes for the electric power charged or discharged in the hydrogen storage apparatus 31 are sequentially arranged. The second scheduling data therefore contains 48×7 numerical values.

As will be described later, the beginning of the first prediction period is changed every 30 minutes. The second prediction period (seven days) always contains the first prediction period (24 hours). Namely, the beginning of the first prediction period occurs after the beginning of the second prediction period. The beginning of the first prediction period in first generation of the first power generation prediction data matches the beginning of the second prediction period.

The scheduling portion 310 generates the second scheduling data based on second demand prediction data, second power generation prediction data, and the stored amount of hydrogen measured by the stored amount sensor 33. The second demand prediction data indicates variations of the electric power predicted to be consumed in house HM during the second prediction period. The second power generation prediction data indicates variations of the electric power predicted to be generated in the solar power generation unit 10 during the second prediction period.

The second demand prediction data is a numerical sequence in which prediction values corresponding to every 30 minutes for the electric power predicted to be consumed in house HM during the second prediction period are sequentially arranged. The second demand prediction data therefore contains 48×7 numerical values. In the embodiment, the externally installed server 100 beforehand calculates the second demand prediction data and transmits the second demand prediction data to the scheduling portion 310 by using communication prior to generation of the second scheduling data. The server 100 generates the second demand prediction data in consideration of past background of the electric power consumed in house HM or differences in electric power consumption depending on the day of the week.

In the embodiment, generation of the second demand prediction data may be performed by the external server 100 or may be performed by the controller 300. Various specific methods (algorithms) can be used to generate the second demand prediction data. There is no restriction on what generates the second demand prediction data in what way.

The second power generation prediction data is a numerical sequence in which prediction values corresponding to every 30 minutes for the electric power predicted to be generated in the solar power generation unit 10 during the second prediction period are sequentially arranged. The second power generation prediction data therefore contains 48×7 numerical values. In the embodiment, the externally installed server 100 beforehand calculates the second power generation prediction data and transmits the second power generation prediction data to the scheduling portion 310 by using communication prior to generation of the second scheduling data. The server 100 generates the second power generation prediction data in consideration of weather forecasting data or an incident angle of sunlight during the second prediction period.

In the embodiment, the external server 100 generates the second power generation prediction data. However, the controller 300 may generate the second power generation prediction data. Various specific methods (algorithms) can be used to generate the second power generation prediction data. There is no restriction on what generates the second power generation prediction data in what way.

The control portion 320 controls operation of the hydrogen storage apparatus 31 and the electric power converter 32 so that the hydrogen storage apparatus 31 charges or discharges the electric power in accordance with the second scheduling data. For example, the control portion 320 controls operation of the hydrogen storage apparatus 31 and the electric power converter 32 so that a value of electric power charged or discharged in the hydrogen storage apparatus 31 equals the first numerical value (control target value) contained in the second scheduling data during the first 30 minutes of the second prediction period. Subsequently, every lapse of 30 minutes changes the control target value of the electric power charged or discharged in the hydrogen storage apparatus 31.

Figure 4:
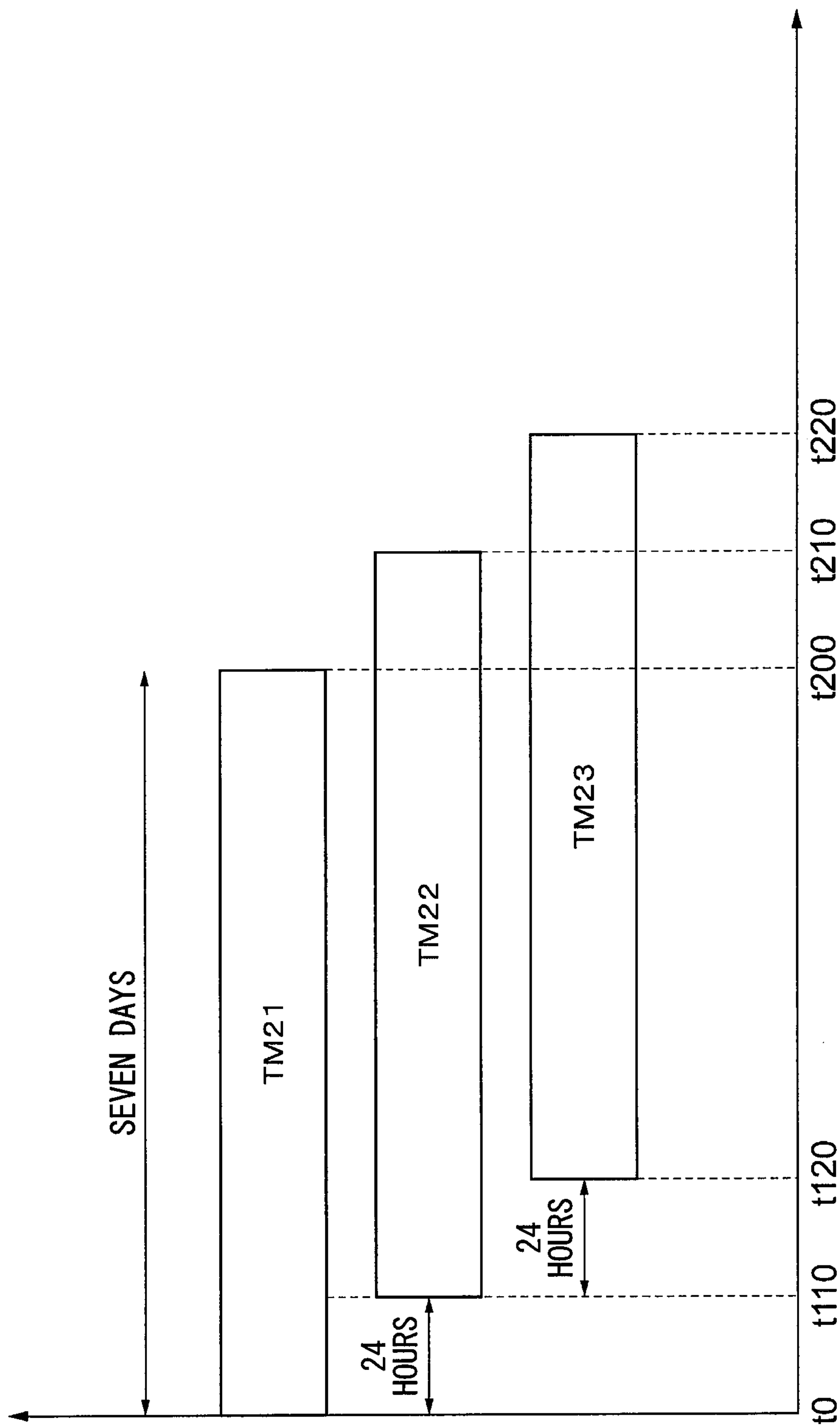
FIG. 4 is a diagram illustrating a second prediction period.
Figure 5:
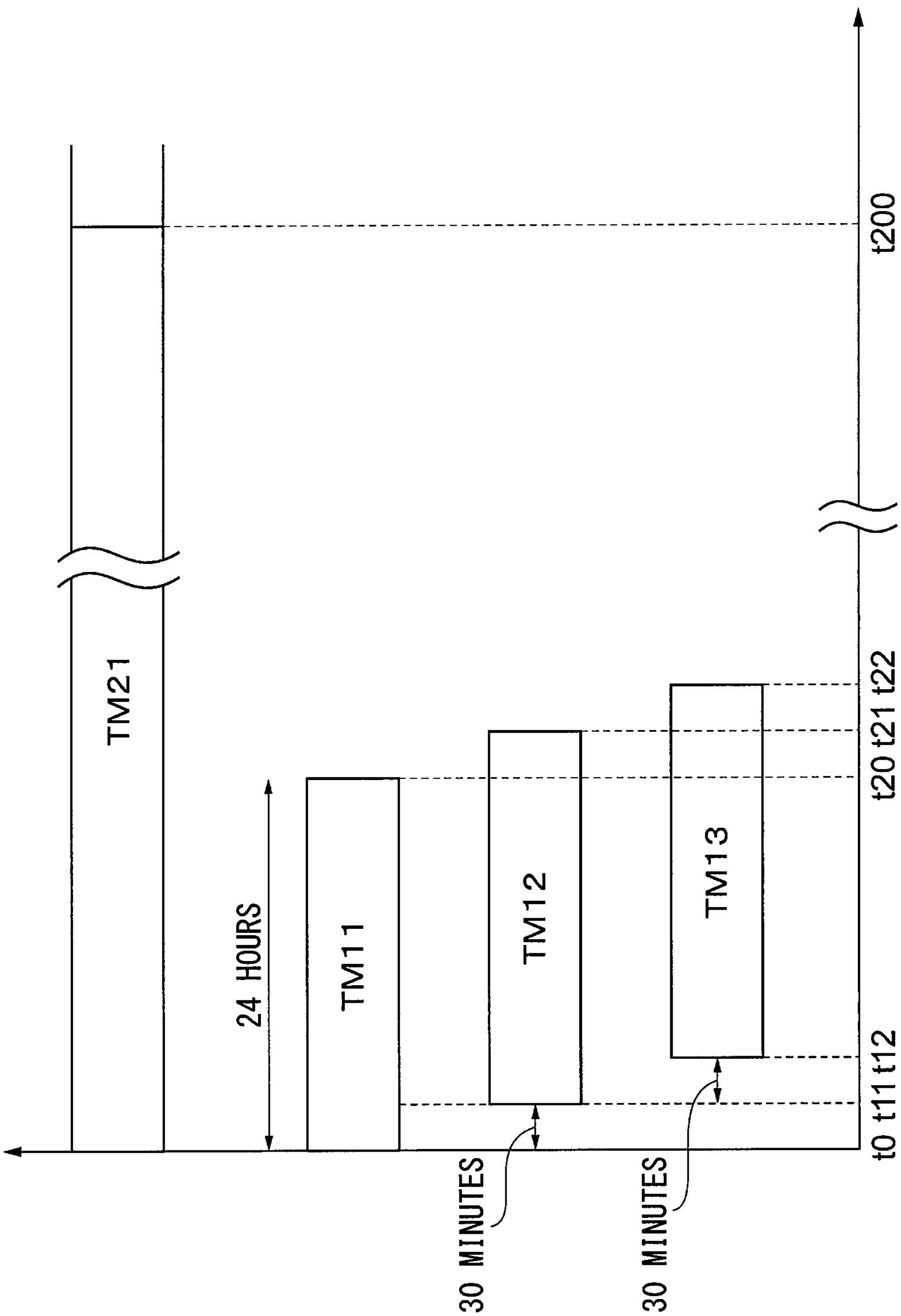
FIG. 5 is a diagram illustrating a first prediction period.

Control performed by the controller 200 and the controller 300 will be described with reference to FIGS. 3 through 5.

The control can be divided into the control performed by the controller 200 over the storage battery unit 20 and the control performed by the controller 300 over the hydrogen storage unit 30. The latter will be described first.

Figure 3:
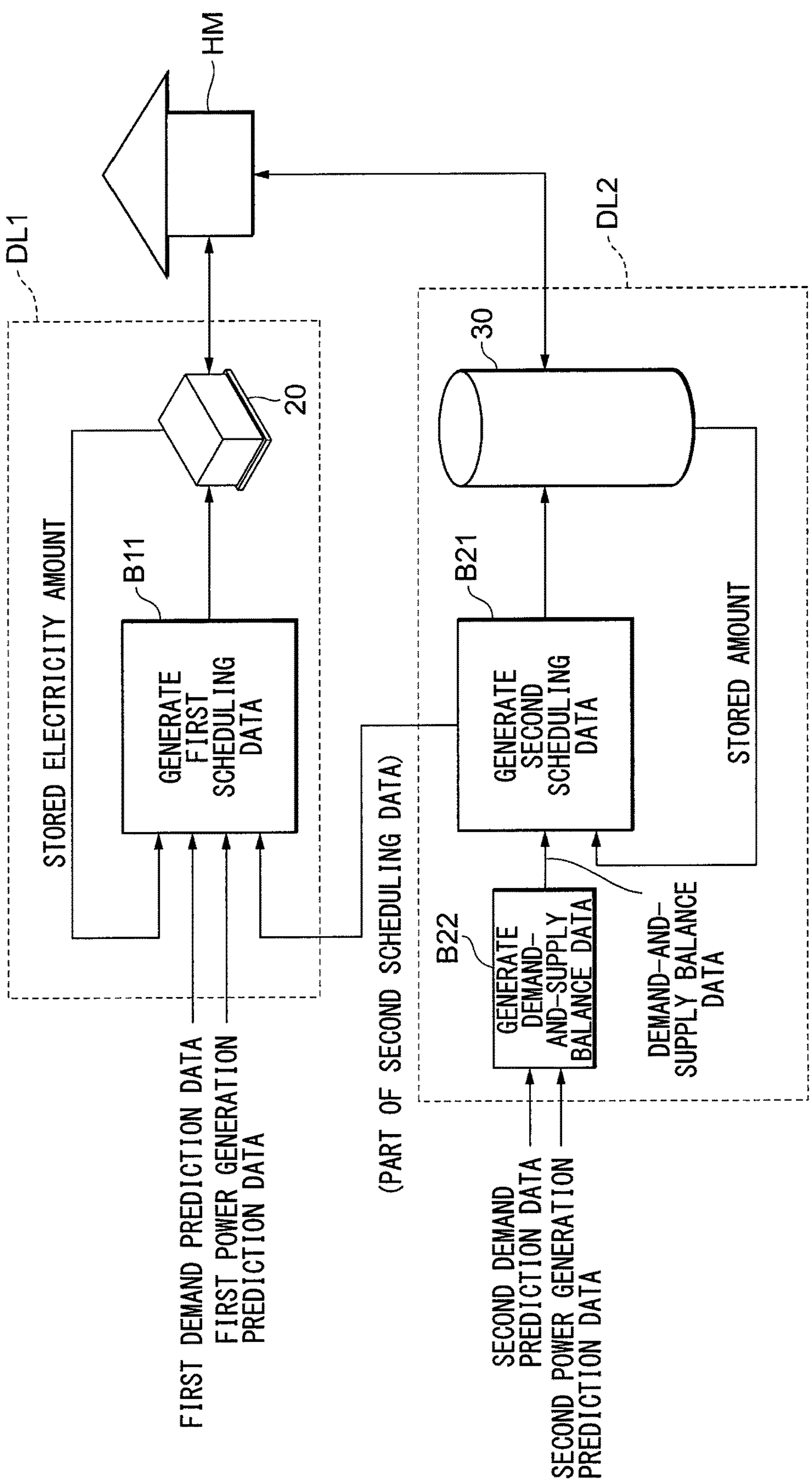
FIG. 3 is a block diagram illustrating the contents of control performed by the first controller and the second controller.

In FIG. 3, broken line DL2 surrounds a control block diagram illustrating the contents of the control performed by the controller 300. FIG. 3 uses two blocks (B21 and B22) to illustrate the control performed by the controller 300.

Block B22 is supplied with the second power generation prediction data and the second demand prediction data to generate demand-and-supply balance data that is a difference between the second power generation prediction data and the second demand prediction data. The demand-and-supply balance data is a numerical sequence in which prediction values corresponding to every 30 minutes for a value resulting from subtracting the electric power predicted to be consumed in house HM from the electric power predicted to be generated in the solar power generation unit 10 during the second prediction period are sequentially arranged. The demand-and-supply balance data therefore contains 48×7 numerical values. The generated demand-and-supply balance data is input to block B21.

Suppose time t0 represents the time to start the second prediction period. Time t0 occurs later than the time when the second power generation prediction data and the second demand prediction data are generated and are input to block B22. The initial second prediction period (symbol TM21 in FIG. 4) is valid until seven days elapse from time t0.

Block B21 is supplied with the demand-and-supply balance data as above and the stored amount of hydrogen measured by the stored amount sensor 33. The stored amount represents a value that is measured by the stored amount sensor 33 and is input to the scheduling portion 310 when the demand-and-supply balance data is input to block B21.

Block B21 generates the second scheduling data based on the demand-and-supply balance data and the stored amount in the hydrogen storage apparatus 31. As above, the scheduling portion 310 of the controller 300 generates the second scheduling data.

The second scheduling data is generated so that the hydrogen storage apparatus 31 stores, wherever possible, the surplus electricity indicated in the demand-and-supply balance data, namely, the electric power that is generated in the solar power generation unit 10 and is predicted not to be consumed in house HM. In other words, the second scheduling data is generated on condition that the stored amount of the hydrogen storage apparatus 31 is prevented from reaching the upper limit wherever possible during a daily time period in which the solar power generation unit 10 generates excess electric power.

The second scheduling data is generated under the above-mentioned condition when the operation requires preventing the reverse power flow from occurring wherever possible (not suppressing the power generation in the solar power generation unit 10 wherever possible). Otherwise, the second scheduling data is generated on the condition appropriate to other operations (such as the one that requires positively performing the reverse power flow). The second scheduling data can be generated to satisfy conditions by using various techniques such as formulating a mixed integer programming problem.

The control portion 320 starts the control when the second scheduling data is generated and the present time reaches time t0 (to start the second prediction period). The control portion 320 controls operations of the hydrogen storage apparatus 31 and the electric power converter 32 so that the electric power charged or discharged in the hydrogen storage apparatus 31 complies with the second scheduling data.

The second scheduling data represents a control target value of the charged or discharged electric power provided at an interval of 30 minutes. The electric power actually charged or discharged in the hydrogen storage apparatus 31 therefore stepwise varies every 30 minutes. A value representing the stored amount of hydrogen measured in the stored amount sensor 33 is input to the controller 300 also during the second prediction period. However, this value has no effect on the control.

The control over the hydrogen storage apparatus 31 and the electric power converter 32 based on the second scheduling data continues from time t0 to time t110 (see FIG. 4), namely, 24 hours later. Meanwhile, the server 100 generates the second demand prediction data and the second power generation prediction data for the next second prediction period (symbol TM22 in FIG. 4), namely, seven days elapsed from time t110 above. The server 100 generates these data before time t110 as the present time and transmits the data to the scheduling portion 310.

The scheduling portion 310 is supplied with the second demand prediction data and the second power generation prediction data concerning the next second prediction period (TM22) and then generates new second scheduling data based on these data and the stored amount of hydrogen measured by the stored amount sensor 33. The new second scheduling data is generated in advance before time t110.

The control portion 320 controls operation of the hydrogen storage apparatus 31 and the electric power converter 32 when the present time reaches time t110 (to start the next second prediction period (TM22)) so that the electric power charged or discharged in the hydrogen storage apparatus 31 complies with the new second scheduling data.

As above, the next second prediction period (TM22) starts before time t200 at which the initial second prediction period (TM21) is ended. Namely, model prediction control in units of seven days is updated in 24-hour periods.

During the next second prediction period (TM22), new second scheduling data is previously generated based on a situation after time t0. Operation of the hydrogen storage apparatus 31 and the electric power converter 32 is controlled based on the second scheduling data. Until time t200 at which the initial second prediction period (TM21) is ended, more appropriate control is performed depending on an actual power usage situation in house HM, as compared with a case of continuing the control based on single second scheduling data. The control reflects a value of stored amount measured in the hydrogen storage apparatus 31 in 24-hour periods. Accordingly, a change in the stored amount does not largely deviate from the prediction and this prevents a subsequent reverse power flow from occurring.

The same control as above is performed from then on. Namely, the next second prediction period (TM23) starts at time t120 after the elapse of 24 hours from the beginning of the second prediction period (TM22). The second scheduling data for the second prediction period (TM23) is generated before time t120.

The description below explains control performed by the controller 200 over the storage battery unit 20. In FIG. 3, broken line DL1 surrounds a control block diagram illustrating the contents of the control performed by the controller 200. FIG. 3 uses one block B11 to illustrate the control performed by the controller 200.

Block B11 is supplied with the first power generation prediction data and the first demand prediction data from the server 100. Block B11 is also supplied with the amount of electric power (stored electricity amount) measured by the stored electricity amount sensor 23. The amount of electric power equals the value that is measured by the stored electricity amount sensor 23 at a time when the first power generation prediction data and the like is input to block B11.

In addition to the above, block B11 is supplied with part of the second scheduling data from block B21. "Part of the second scheduling data" is, of the second scheduling data having an aggregate of control target values for seven days, the extracted data that only corresponds to the first prediction period (data for the first 24 hours).

Block B11 subtracts each value of the second scheduling data correspondingly from each value of the first demand prediction data. Namely, the electric power predicted to be output from the hydrogen storage apparatus 31 (a negative value for the electric power predicted to be charged) at the same time as each of the first demand prediction data is subtracted from each value of the first demand prediction data. The resulting values are settled as new first demand prediction data.

Block B11 generates the first scheduling data based on the first power generation prediction data, the first demand prediction data (updated based on the second scheduling data), and the stored electricity amount in the storage battery apparatus 21. As above, the scheduling portion 210 of the controller 200 generates the first scheduling data. The beginning of the first prediction period (symbol TM11 in FIG. 5) is t0 equal to the beginning of the second prediction period (TM21). The first scheduling data is generated in advance before time t0.

The first scheduling data is generated so that the electric power rate to be paid to an electric power company based on the usage of electrical grid CP is decreased wherever possible. For example, the first scheduling data is generated under the condition of preventing shortage of the stored electricity amount in the storage battery apparatus 21 during a daily time period in which an electric utility rate is highest in a day and the solar power generation unit 10 generates a small quantity of electric power. The first scheduling data can be generated to satisfy conditions by using various techniques such as formulating a mixed integer programming problem.

As above, the first scheduling data may be generated under the condition appropriate to the operation of decreasing the electric power rate wherever possible, but may be also generated under conditions appropriate for the other operations.

The control portion 220 starts the control when the first scheduling data is generated and the present time reaches time t0 (to start the first prediction period). The control portion 220 controls operation of the electric power converter 22 so that the electric power charged or discharged in the storage battery apparatus 21 complies with the first scheduling data.

The first scheduling data represents a control target value of the charged or discharged electric power at an interval of 30 minutes. The electric power actually charged or discharged in the storage battery apparatus 21 therefore stepwise varies every 30 minutes. A value representing the stored electricity amount measured with the stored electricity amount sensor 23 is input to the controller 200 also during the first prediction period. However, this value has no effect on the control.

The control over the electric power converter 22 based on the first scheduling data continues from time t0 to time t11 (see FIG. 5), namely, 30 minutes later. Meanwhile, the server 100 generates the first demand prediction data and the first power generation prediction data for the next first prediction period (symbol TM12 in FIG. 5), namely, 24 hours elapsed from time t11 above. The server 100 generates these data prior to time t11 and transmits the data to the scheduling portion 210.

The scheduling portion 210 is supplied with the first demand prediction data and the first power generation prediction data concerning the next first prediction period (TM12) and then generates new first scheduling data. The new first scheduling data is generated in advance before time t11.

Block B11 is supplied with part of the second scheduling data from block B21 to generate the new first scheduling data, similarly to the first generation of the scheduling data. "Part of the second scheduling data" is, of the second scheduling data having an aggregate of control target values for seven days, the extracted data corresponding to only the next first prediction period (TM12) (data for the 24 hours at time t11 and later).

Each value of the second scheduling data is then subtracted correspondingly from each value of the first demand prediction data. The resulting values are settled as new first demand prediction data. New first scheduling data is generated based on the second power generation prediction data, the second demand prediction data (updated based on the second scheduling data), and the stored electricity amount in the storage battery apparatus 21.

The control portion 220 controls operation of the electric power converter 22 when the present time reaches time t11 (to start the next first prediction period (TM12)) so that the electric power charged or discharged in the storage battery apparatus 21 complies with the new first scheduling data.

As above, the next first prediction period (TM12) starts before time t20 at which the initial first prediction period is ended (TM11). Namely, model prediction control in units of 24 hours is updated in half-hour periods.

New first scheduling data is previously generated based on a situation after time t0 during the next first prediction period (TM12). Operation of the electric power converter 22 is controlled based on the first scheduling data. Until time t20 at which the initial first prediction period (TM11) is ended, more appropriate control is performed depending on an actual power usage situation in house HM, as compared with a case of continuing the control based on single first scheduling data. The control reflects a value of stored electricity amount measured with the storage battery apparatus 21 in short periods of 30 minutes. Accordingly, a change in the stored electricity amount does not largely deviate from the prediction and this prevents a subsequent possible reverse power flow from occurring.

The same control as above is performed from then on. Namely, the next first prediction period (TM13) starts at time t12 after the elapse of 30 minutes from the beginning of the first prediction period (TM12). The first scheduling data for the first prediction period (TM13) is generated before time t12.

As above, power supply system PS in the embodiment includes the storage battery apparatus 21 with relatively small capacity and the hydrogen storage apparatus 31 with relatively large capacity. Charge or discharge in the storage battery apparatus 21 is controlled based on the first scheduling data that is generated in consideration of a change in the electric power demand during a short period of 24 hours and a change in the power generation quantity of the solar power generation unit 10.

Charge or discharge in the hydrogen storage apparatus 31 is controlled based on the second scheduling data that is generated in consideration of a change in the electric power demand during a long period of seven days and a change in the power generation quantity of the solar power generation unit 10. The system also performs control corresponding to variations in the demand-and-supply balance during a relatively long period.

The controller 200 (scheduling portion 210) generates the first scheduling data based on the second scheduling data previously generated by the controller 300 (scheduling portion 310). The storage battery apparatus 21 controls charge and discharge in cooperation with the hydrogen storage apparatus 31 that controls charge and discharge. The system performs charge and discharge based on the charge-discharge schedule in consideration of variations in the demand-and-supply balance during a short period (24 hours) and variations in the demand-and-supply balance during a long period (seven days). The system suppresses reverse power flow and is capable of local production for local consumption in terms of electric power.

For example, the amount of sunlight is expected to decrease three days later and the solar power generation unit 10 is supposed to generate a small amount of electric power. In such a case, control is performed to previously increase the stored electricity amount of the hydrogen storage apparatus 31. Power supply system PS can thereby continue to supply the electric power to house HM.

For example, the fine weather is expected to continue three days later and the solar power generation unit 10 is supposed to generate a large amount of electric power. In such a case, control is performed to previously decrease the stored electricity amount of the hydrogen storage apparatus 31. The hydrogen storage apparatus 31 thereby stores surplus electricity even if the fine weather continues and the power generation quantity increases. The system can prevent the reverse power flow from occurring.

The scheduling portion 210 in the controller 200 repeatedly generates and updates the first scheduling data, as needed, every period (30 minutes) shorter than the first prediction period (24 hours). The system performs fine-tuned control depending on situations and can therefore prevent the prediction of power generation quantity from greatly differing and suppress an occurrence of the reverse power flow.

The scheduling portion 310 in the controller 300 repeatedly generates and updates the second scheduling data, as needed, every period (24 hours) shorter than the second prediction period (seven days). The system updates the second scheduling data every 24 hours depending on circumstantial situations in consideration of changes in the generated electric power during a long period. The system can therefore prevent the prediction of power generation quantity from greatly differing.

The cycle (24 hours) to update the second scheduling data is longer than the cycle (30 minutes) to update the first scheduling data. The longer time can be used to calculate the second scheduling data that includes a large number of items of data. The controller 300 need not use a high-end CPU.

Power supply system PS can supply the electric power to not only house HM, but also factories or commercial facilities. The solar power generation unit 10 may be replaced by other apparatuses (such as a wind-power generation unit) that can generate the electric power by using natural energy.

There has been illustrated the embodiment with reference to specific examples. However, the embodiment is not limited to the specific examples. Namely, the embodiment is applicable to the specific examples to which one of ordinary skill in the art adds design changes as needed. For example, the elements, layouts, materials, conditions, shapes, and sizes of the above-mentioned specific examples are not limited to those illustrated, but may be changed as needed. The elements of the above-mentioned embodiment can be combined if possible from technical viewpoint. Any of the combinations can be also considered as the embodiment.

What is claimed is:

1. A power supply system to supply electric power to a building, the power supply system comprising:

a power-generating apparatus that supplies the building with electric power generated by using natural energy;

a first electric storage apparatus that stores electric power generated by the power-generating apparatus and electric power supplied from an electrical grid and is capable of supplying stored electric power to the building;

a second electric storage apparatus that has a larger capacity than the first electric storage apparatus, stores electric power generated by the power-generating apparatus and electric power supplied from the electrical grid, and is capable of supplying stored electric power to the building;

a first controller that controls charge and discharge of the first electric storage apparatus; and a second controller that controls charge and discharge of the second electric storage apparatus, wherein:

the first controller includes:

a first scheduling portion that generates first scheduling data indicating transition of electric power to be charged and discharged from the first electric storage apparatus during a first prediction period, based on first demand prediction data indicating transition of electric power predicted to be consumed in the building during the first prediction period, first power generation prediction data indicating transition of electric power predicted to be generated in the power-generating apparatus during the first prediction period, and an actual measurement value of stored electricity amount of the first electric storage apparatus; and a first control portion that controls charge and discharge of the first electric storage apparatus to comply with the generated first scheduling data;

the second controller includes:

a second scheduling portion that generates second scheduling data indicating transition of electric power to be charged and discharged from the second electric storage apparatus during a second prediction period containing the first prediction period, based on:

second demand prediction data indicating transition of electric power predicted to be consumed in the building during the second prediction period;

second power generation prediction data indicating transition of electric power predicted to be generated in the power-generating apparatus during the second prediction period; and an actual measurement value of stored electricity amount of the second electric storage apparatus; and a second control portion that controls charge and discharge of the second electric storage apparatus to comply with the generated second scheduling data; and the first scheduling portion generates the first scheduling data based on the second scheduling data previously generated by the second scheduling portion.

2. The power supply system according to claim 1, wherein:

generation of the first scheduling data by the first scheduling portion is performed after electric power predicted to be supplied from the second electric storage apparatus to the building during the first prediction period is previously subtracted from the first demand prediction data.

3. The power supply system according to claim 1, wherein:

the first scheduling portion repeatedly generates and updates the first scheduling data every first cycle shorter than the first prediction period.

4. The power supply system according to claim 3, wherein:

the second scheduling portion repeatedly generates and updates the second scheduling data every second cycle shorter than the second prediction period.

5. The power supply system according to claim 4, wherein:

the second cycle is longer than the first cycle.

* * * * *